March 19, 1957 J. SUNNEN 2,785,473
INTERNAL GAGE FOR CIRCULAR SIZE
Filed June 23, 1953 5 Sheets-Sheet 1
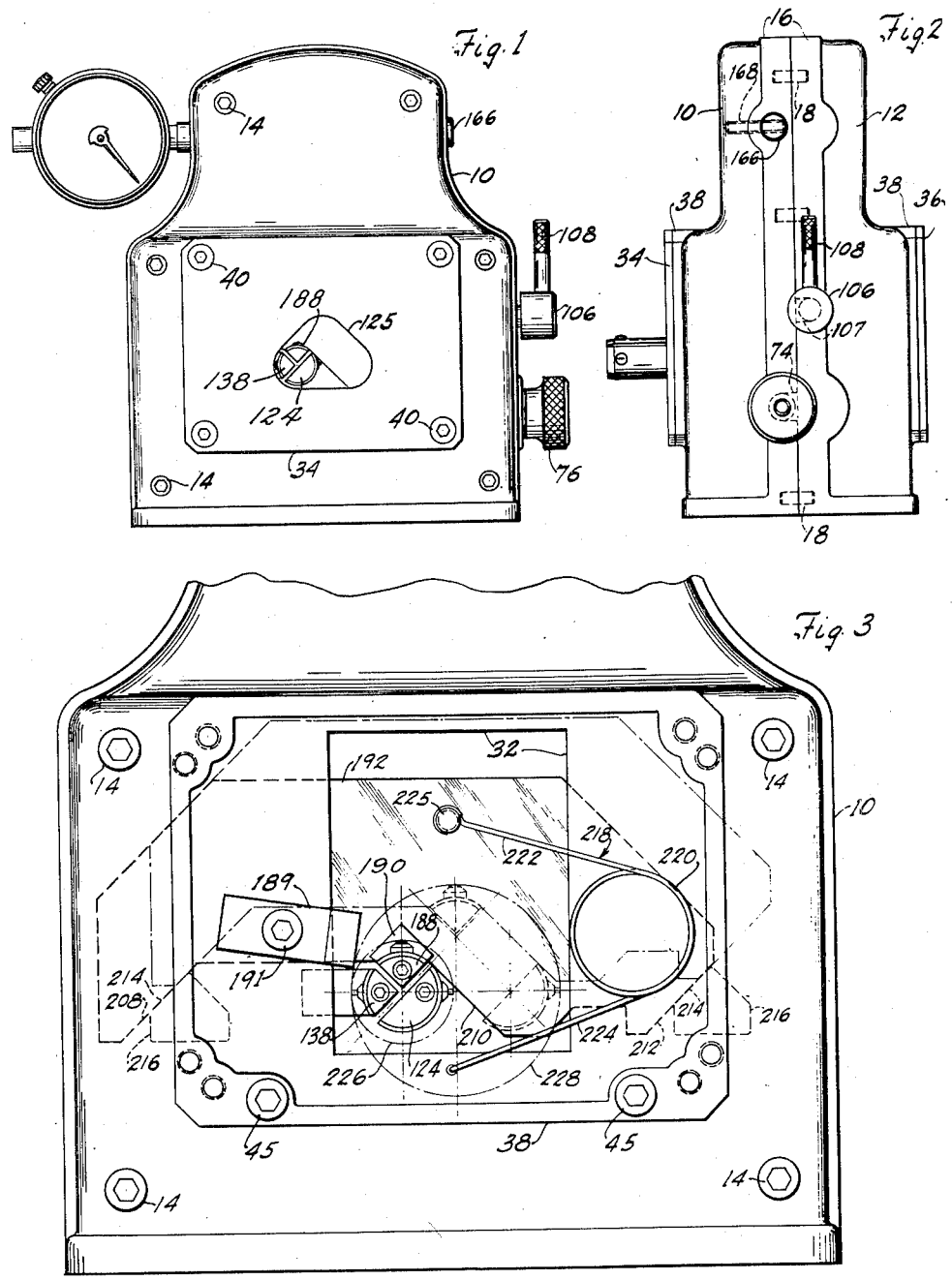
INVENTOR
JOSEPH SUNNEN
BY George R. Ericson
ATTORNEY March 19, 1957

J. SUNNEN 2,785,473

INTERNAL GAGE FOR CIRCULAR SIZE

Filed June 23, 1953

INVENTOR
JOSEPH SUNNEN
BY George R. Ericson
ATTORNEY

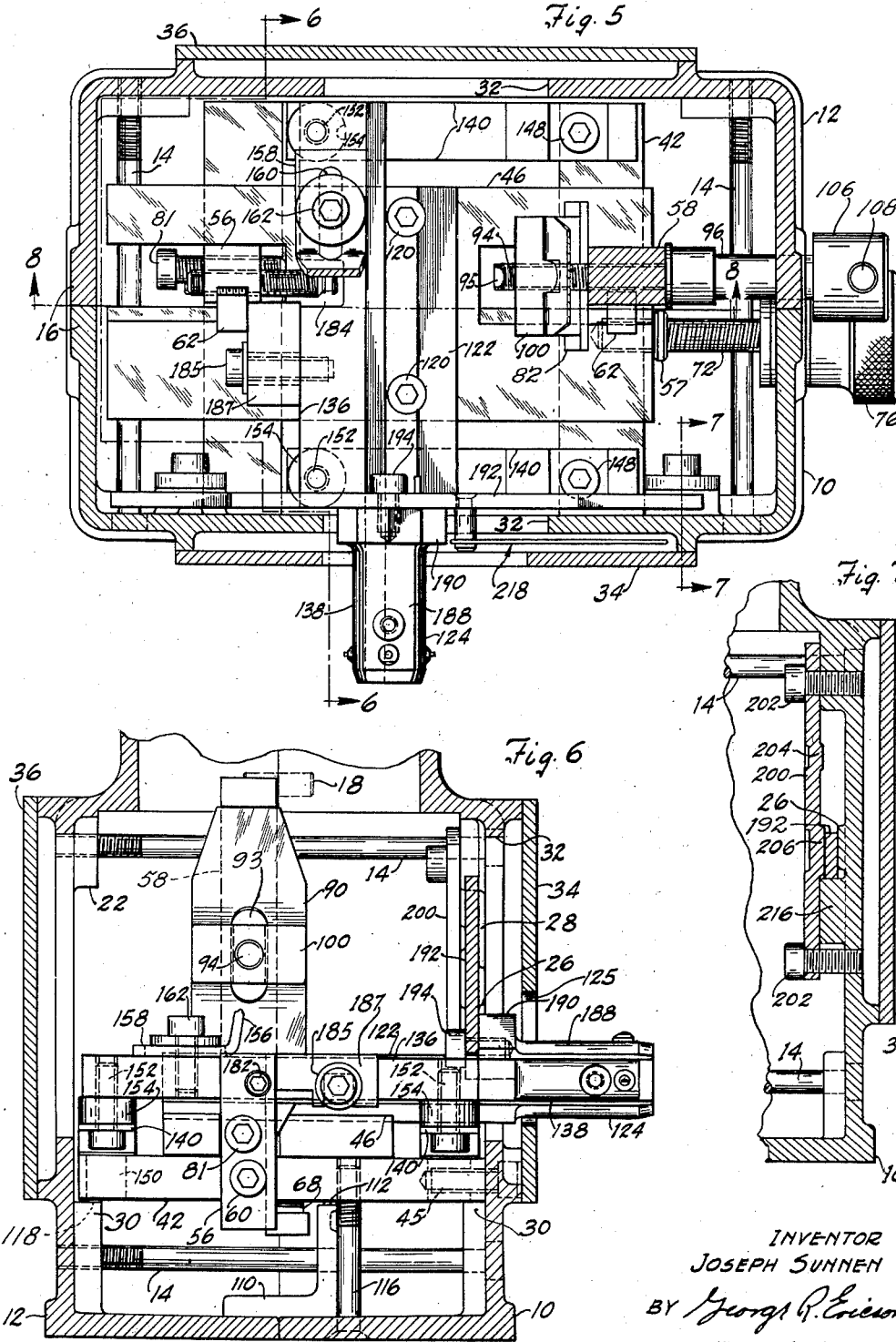

March 19, 1957

J. SUNNEN 2,785,473

INTERNAL GAGE FOR CIRCULAR SIZE

Filed June 23, 1953

INVENTOR.
JOSEPH SUNNEN
BY George R. Ericson
ATTORNEY

March 19, 1957   J. SUNNEN   2,785,473
INTERNAL GAGE FOR CIRCULAR SIZE
Filed June 23, 1953   5 Sheets-Sheet 5
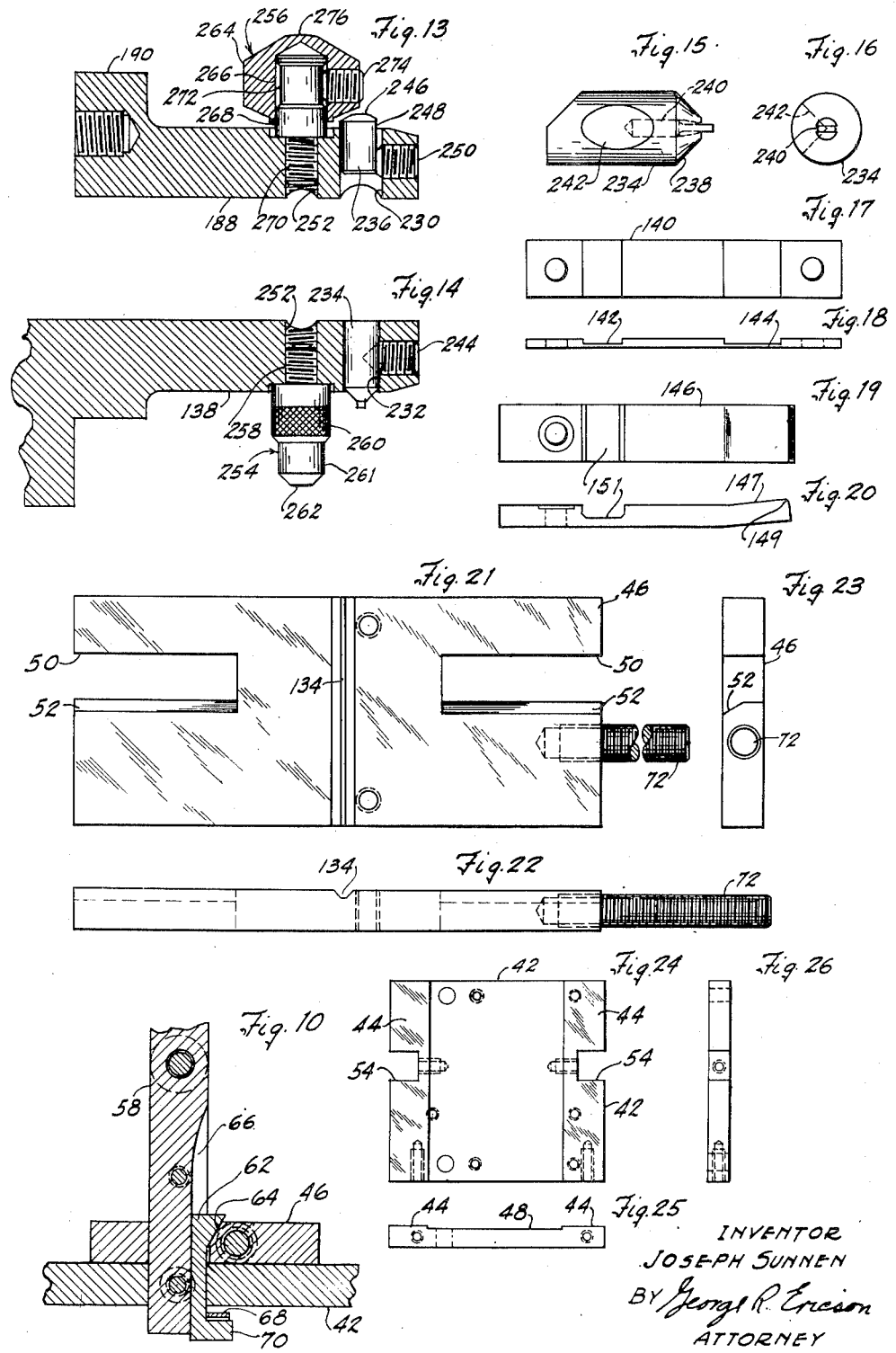

United States Patent Office 2,785,473
Patented Mar. 19, 1957

2,785,473

INTERNAL GAGE FOR CIRCULAR SIZE

Joseph Sunnen, Clayton, Mo.

Application June 23, 1953, Serial No. 363,569

22 Claims. (Cl. 33—178)

This invention relates to gages and particularly to comparator type gages for gaging internal diameters.

In my co-pending application, Serial No. 289,990, filed May 26, 1952, now Patent No. 2,735,188, issued February 21, 1956, for improvement in a "Hole Gage," I disclosed a three point adjustable internal diameter gage having three contact points arranged in the formation of an isosceles triangle, the base of which is twice its height. With this arrangement the central point at the apex of the triangle acts as a centralizer to permit rapid accurate gaging of a bore by insuring that the two gaging points on the base line engage the bore precisely at its diameter. Further, means were disclosed for adjusting one of the gaging points with respect to the other along the base line of the triangle and for causing the centralizer point to be moved simultaneously therewith in such manner as to maintain its constant relationship with the gaging points throughout the range of adjustment of the gage. The other of the two gage points, being resiliently mounted for limited movement, indicates through multiplication of its movements, slight variations in diameter of the work being compared.

An object of the present invention is to provide a generally new and improved gage of the above character which is of simple and rugged construction and of particularly high stability and accuracy throughout its range of adjustment.

A further object is to provide a three point internal diameter gage of the above character wherein the work to be gaged may be supported on the centralizer point without impairing the accuracy of the gage.

A further object is to provide a novel single screw adjusting means whereby one of the gaging points is adjusted along a horizontal line with respect to the other gaging point and whereby the centralizer point is moved simultaneously therewith in such manner that it is always precisely midway between the gaging points and spaced perpendicularly from the horizontal line connecting them by precisely one-half the distance between them.

A further object is to provide a simple, effective, and convenient means for locking the gage in any set position.

A further object is to provide a gage of the above character having contact point carrying members adapted to receive removable gaging point members and centralizer point members of varying length, thereby to extend the range of use of the gage.

A further object is to provide improved gage point members having inserts of extremely hard material and to provide centralizer point members which are constructed so as to be conveniently adjustable to compensate for wear.

A further object is to provide a rigid casing for the gage comprising two identical, detachably connected portions which may be formed in the same die and either of which may be employed to wholly support the gage mechanism or to provide a detachable cover.

These and other objects and advantages which become apparent when reading the following description in connection with the accompanying drawings are attained in the invention.

In the drawings:

Fig. 1 is a half scale front elevation of a gage constructed in accordance with the invention;

Fig. 2 is a right side elevation of the gage shown in Fig. 1;

Fig. 3 is a full scale partial front elevation of the gage with the front cover plate removed;

Fig. 5 is a horizontal section taken on line 5—5 of Fig. 4;

Fig. 6 is a vertical section taken on line 6—6 of Fig. 5;

Fig. 7 is a vertical section taken on line 7—7 of Fig. 5;

Fig. 10 is a vertical section taken on line 10—10 of Fig. 4;

Fig. 13 is a vertical section through the centralizer point carrying member and is taken on line 13—13 of Fig. 12;

Fig. 14 is a horizontal section through the outer end portion of the sensitive point carrying member and is taken on line 14—14 of Fig. 12;

Fig. 15 is a still further enlarged detailed side view of one of the gaging point members;

Fig. 16 is a front end view of the gage point member shown in Fig. 15;

Fig. 17 is a full scale plan view of one of the flexible reeds which support a sensitive point carrying member;

Fig. 18 is a side view of the reed shown in Fig. 17;

Fig. 19 is a full scale plan view of one of the reed support members;

Fig. 20 is a side view of the reed support member shown in Fig. 19;

Fig. 21 is a full scale plan view of the sliding plate which carries the movable contact point carrying member;

Fig. 22 is a side view of the plate shown in Fig. 21;

Fig. 23 is a end view of the plate shown in Fig. 21;

Fig. 24 is a half scale plan view of the stationary support plate;

Fig. 25 is an end view of the support plate shown in Fig. 24; and

Fig. 26 is a side view of the plate shown in Fig. 24.

Figure 4:
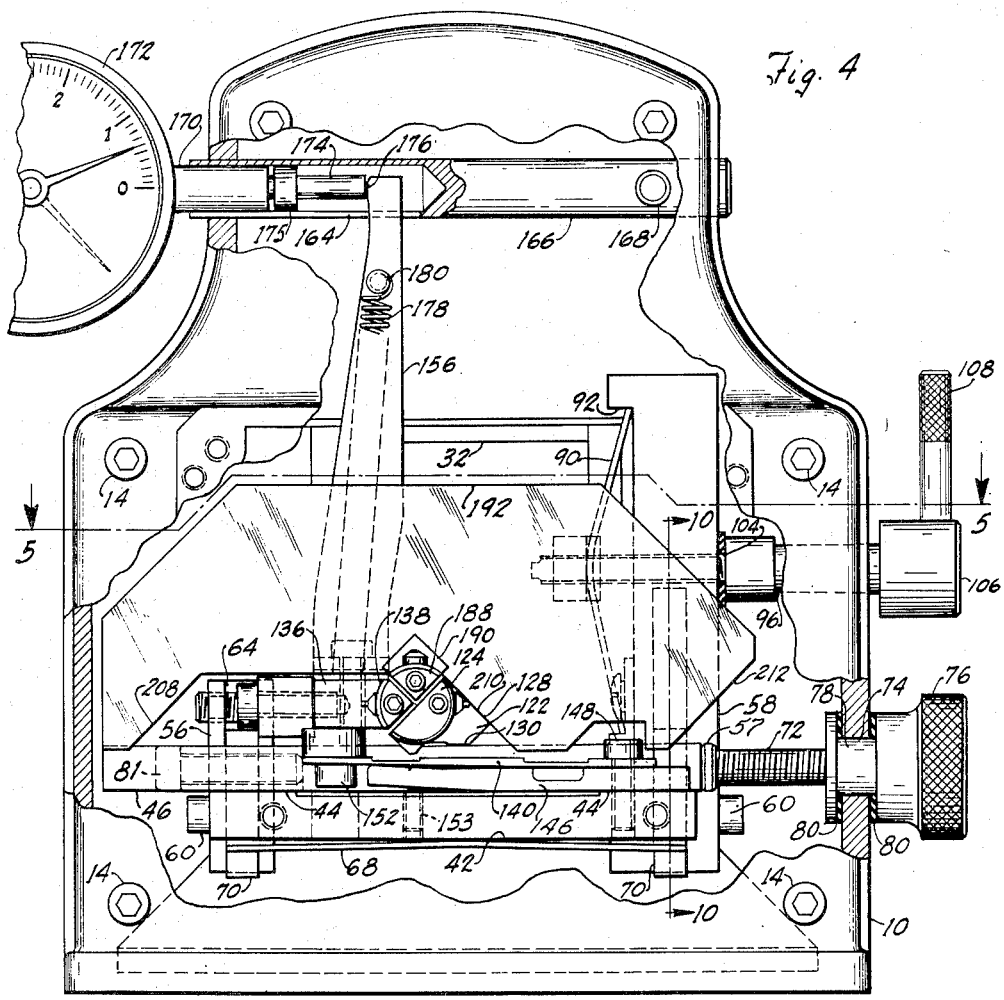
Fig. 4 is a full scale front elevation with parts of the front casing broken away and with other parts shown in section.

The gage mechanism is enclosed in a rigid casing comprising identical front and rear half sections 10 and 12 which are detachably connected by six long cap screws 14. The casing sections, being preferably die castings of suitable material, are provided at their open ends with meeting flanges 16 in which alignment dowels 18 are carried. The dowels may be press fitted in the front casing section 10. The casing sections are also provided with internal bosses 20, 22, and 24, which receive the countersunk attaching screws 14, and are further provided with internal guide pads 26 and 28 and a mounting pad 30, for purposes to be described.

A rectangular opening 32 is provided in each of the casing sections and rectangular detachable cover plates, 34 on the front casing section and 36 on the rear casing section, enclose these openings. The exterior face of cover plate 34 is ground flat and smooth for a purpose to be described. External rectangular pads 38 on the casing sections provide flat surfaces for mounting the cover plates and provide additional metal thickness to receive the four countersunk, flat-head, cover plate attaching screws 40 as well as other attaching screws to be described.

The gage mechanism includes a rigid, horizontally arranged, rectangular, stationary support plate 42 which abuts at one edge the inside surface of the front casing section 10 and is rigidly attached thereto by countersunk head cap screws 45, see Fig. 6. Plate 42 is shown in detail in Figs. 24 to 26. The upper surface of plate 42 is provided with a slightly raised portion 44 at each end, which portions extend across the plate perpendicularly to its attached edge. These raised strips are ground true and provide spaced bearing surfaces for an overlying transversely sliding plate member 46, see Figs. 8 and 9. The raised bearing surfaces 44 are provided by milling a slight central recess 48 across the upper surface of plate 42.

The sliding plate 46, shown detailed in Figs. 21 and 23, is provided with rectangular slots 50 extending inwardly from each end of the plate to form guideways. The upper edges of the plate 46, along one side of the slots 50, are beveled at an angle of 60° to the surface of the plate, as indicated at 52. The stationary support plate 42 is provided with rectangular slots 54 at each end into which are fitted vertical guide blocks 56 and 58 which are rigidly attached to the plate by cap screws 60. The guide blocks 56 and 58 are entered into the guideways 50 in the sliding plate 46, but the fit is loose and a pair of downwardly tensioned, vertically slidable, brass guide shoes 62, see Figs. 5 and 10, having 60° beveled surfaces 64 which cooperate with the beveled surfaces 52 on the sliding plate, urge the sliding plate horizontally so that the straight sides of the slots 50 are constantly in engagement with the guide blocks and also urge the sliding plate constantly downward in firm engagement with the stationary plate below. The guide blocks 56 and 58 are provided with milled grooves 64 and 66 respectively in which the brass guide shoes 62 are slidably fitted, and a bowed leaf spring 68, see Fig. 4, bearing intermediately of its ends against the underside of support plate 42 and at each end against a foot portion 70 on each of the guide shoes, exerts a constant downward force on the guide shoes. By making the angle of the guide shoe surfaces 64 and the beveled guideway surfaces 52 at 60° with the horizontal, appreciably greater horizontal thrust than vertical thrust is attained, which results in the slide plate being more rigid against horizontal thrust.

In order to adjustably position the sliding plate 46 on the stationary plate, it is provided with a screw threaded stud 72 which may be screw threaded into the plate, as shown, and staked therein in a suitable manner to prevent its turning therein. The stud 72 extends through an opening 74 in the side wall of the casing 10 and has fitted thereon a round knurled thumb nut 76. The nut 76 has a reduced intermediate portion 78 which fits into the opening 74 so that the nut is journaled in the side wall of the casing 10 and is restrained from longitudinal motion along the stud 72. The opening 74 has the form of a round-bottomed recess, see Fig. 2, the open end of said recess being closed by the flange of the rear casing section. Plastic washers 80 are provided to reduce friction and wear between the nut and casing wall. An adjustable stop screw 81 threadedly engaged in the guide block 56 limits the leftward travel of the sliding plate 46 with reference to Fig. 8, and a soft metal collar 57 on the stud 72 abuts the inner end of thumb nut 76 to limit the rightward travel of the plate.

Figure 8:
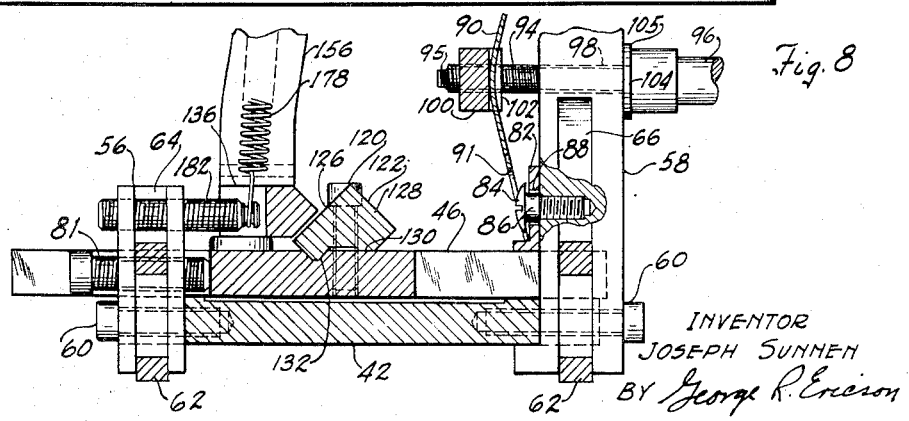
Fig. 8 is a vertical section taken on line 8—8 of Fig. 5.
Figure 9:
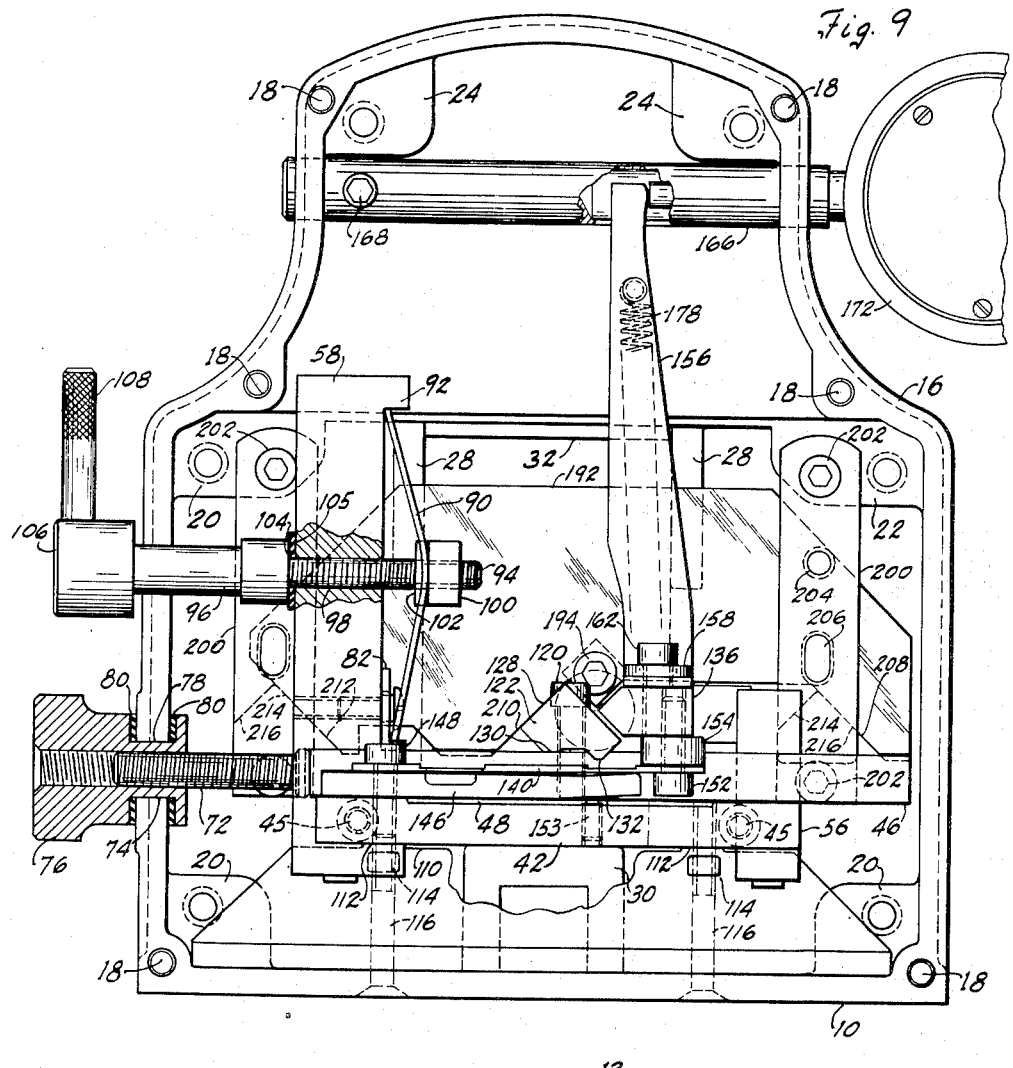
Fig. 9 is a full scale rear elevation of the gage with the rear half of the casing removed and with parts shown in section.
Figure 11:
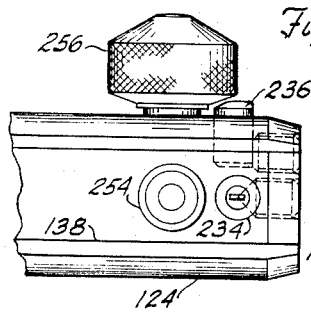
Fig. 11 is an enlarged side view of the projecting ends of the contact point carrying members showing two sets of points of different length and construction mounted therein.
Figure 12:
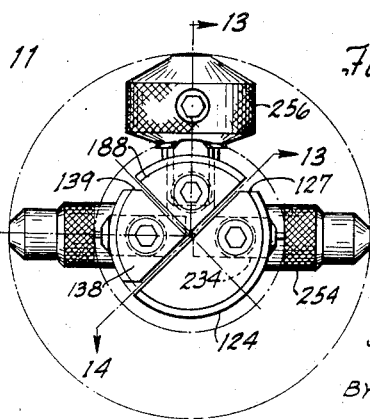
Fig. 12 is a front end view of the point carrying members shown in Fig. 11.

The guide block 58 is considerably longer than the block 56 and extends vertically to serve the added purpose of providing a support post for a clamping mechanism, whereby the sliding plate may be locked in any adjusted position. Referring to Fig. 8, the clamping mechanism includes an angle clamp shoe 82, the horizontal leg of which bears on the surface of the sliding plate 46. The clamp shoe is retained in position against the guide block 58 by a shouldered screw 84 having a shoulder 86 which loosely fits a hole 88 in the vertical leg of the angle clamp shoe. The length of the screw shoulder is also slightly longer than the thickness of the vertical leg so that the shoe may have limited free vertical movement.

To provide a downward pressure on the clamp shoe a formed leaf spring 90 is provided, the lower end of which bears against the horizontal leg of the clamp shoe and the upper end of which bears against the under surface of a projection 92, at the upper end of guide block 58, see Figs. 4 and 8. The spring 90 has a central cut-out portion 91 at its lower end to provide clearance for the head of screw 84. Intermediately of the length of leaf spring 90 is a vertically elongated hole 93 through which passes the reduced screw threaded end portion 94 of a shaft 96, see Figs. 6 and 9. The threaded portion 94 is journaled in a hole 98 extending through the guide block 58. The end of threaded portion 94 is fitted with a rectangular nut 100 which bears against the convex surface of spring 90 and has a rectangular reduced portion 102 which enters the slotted hole 93 to prevent the turning of the nut.

The shaft 96 bears against the guide block 58 at its shoulder 104, formed by the reduction in diameter of the threaded portion 94, and a plastic washer 105 is provided between shoulder 104 and block 58 to reduce friction and wear. The other end of shaft 96 passes outwardly through a round-bottomed recess 107 in the flange of the rear casing section 12, see Fig. 2, which permits removal of the rear cover section. At its exterior end shaft 96 is provided with a head 106 and a handle 108. It will be seen that as the handle 108 is turned so that the screw 94 progresses through the nut 100, the bowed leaf spring will be straightened and will exert considerable pressure on the clamp shoe 82 due to the "toggle effect" lever advantage, and sufficient downward force for locking the sliding plate 46 securely in an adjusted position is thereby achieved by a partial turn of handle 108 with the application of a very moderate force. Threaded portion 94 is slightly flattened at its outer end at 95 to prevent the inadvertent withdrawal of the screw from nut 100.

The stationary support plate 42, besides being attached at one edge to the inner face of casing section 10 by the spaced screws 45, is supported at this same edge intermediately of its length by the support pad 30. Plate 42 is further supported at a point spaced from its connected edge by an angle member 110. Angle 110 is provided with two spaced and ground support surfaces 112 which project from the end of its vertical leg and which may be conveniently provided by displacing metal as by punching partly through the vertical leg at points 114. A pair of countersunk head screws 116, lying close against the back of the vertical leg of angle 110, connect the stationary plate 42 with the base of casing 10, and as these screws are tightened, plate 42 is pulled firmly against the support angle 110 and the angle 110 is firmly held in position between the plate 42 and the base of casing 10. The opposite unattached edge of plate 42 does not rest firmly upon the pad 30 on the rear casing section 12, the top of the pad being ground off very slightly to provide a slight clearance as indicated at 118 in Fig. 6, so as to permit the free assembly and removal of the rear casing section.

Extending across the upper surface of sliding plate 46 and rigidly attached thereto by cap screws 120 is a gaging point finger 122, which will be referred to as the adjustable gaging point finger. The finger 122 has a forwardly extending portion 124 which extends exteriorly of the casing 10 through opening 32 in the casing and through an opening 125 in the front cover plate 34. The exteriorly projecting portion 124 is substantially semi-circular in cross-section with its flat side at 45° to the surface of plate 46. The cross-sectional configuration of the main portion of finger 122 is polygonal, having one upper side 126 which coincides with the flat surface of the projecting semi-circular portion and an adjacent side 128 perpendicular to side 126, and which is, therefore, at 45° to the horizontal surface of plate 46. This sectional shape further includes a lower horizontal surface 130 which bears on the surface of plate 46 and a downwardly projecting V-shaped rib 132 which interfits with a V-shaped groove 134 extending across the surface of plate 46 and firmly locks the finger in fixed alignment, see Figs. 8 and 21.

A second gaging point finger 136, which is referred to as the sensitive gaging point finger, is provided and arranged parallel with finger 122. Finger 136 has an exteriorly projecting forward portion 138 which is coextensive with portion 124 of finger 122 and is substantially a quadrant in cross-section. The finger 136 is connected at spaced points along its length to a pair of flexible reeds 140, shown in detail in Figs. 17 and 18. Reeds 140 are constructed of spring steel strips of sufficent thickness to withstand the pressure of attaching screw heads without deformation, the required flexibility of the reeds for the purpose being attained by reducing the thickness at intermediate portions 142 and 144. The reeds 140, lying parallel along the front and rear edges of plate 42, are mounted on elongated longitudinally coextending support blocks 146, shown in detail in Figs. 19 and 20. The reeds and support blocks are jointly connected at one end to support plate 42 by cap screws 148.

At their free ends, the reeds carry the finger 136, which is attached to the reeds by screws 152 and which is spaced vertically from the reeds by spacers 154, see Fig. 6. Clearance holes 150 are provided in plate 42 to permit the assembly or removal of screws 152.

The support blocks 146 have a slightly turned up portion 147 at their free ends and the upper edges of their free ends are rounded at 149 to provide pivot points for the overlying reeds. The support blocks 146 are also each provided with a portion 151 of reduced thickness and a pair of round end set screws 153 carried in plate 42 extend upward through plate 42 and bear against the under sides of the support blocks. By means of these set screws 153 and by reason of the slight yieldability imparted to the support blocks by the reduced portions 151, the relative vertical positions of the reed supported points of finger 136 may be closely adjusted so that the finger is truly parallel with the horizontal sliding plate 46. Also, by this arrangement, the vertical position of finger 136 with respect to adjustable finger 122 may be adjusted so that gaging points carried by these fingers, to be described later, may be placed in precise horizontal alignment.

Attached to the upper surface of finger 136 is a vertically extending actuator arm 156. The arm 156 has a foot portion 158 provided with a slotted hole 160 through which passes an attaching screw 162. The upper end of arm 156 enters a longitudinal slot 164 in the tubular end portion of a horizontal shaft 166. The shaft 166 is slidably supported in holes in the side walls of the front casing section 10 and is secured against longitudinal or rotational movement, after being properly positioned, by a set screw 168 which is threadedly engaged in the shaft and is of sufficient length to bear against the wall of the front casing section 10 when tight. The tubular end of shaft 166 is adapted to receive the barrel 170 of a conventional dial indicator gage 172 which has a sensitive gage operating stem 174 abutting at its end a rounded surface 176 at the upper end of actuating arm 156. The tubular end of shaft 166, being slotted at 164, provides a yieldable bore into which the gage barrel 170 may be easily inserted or removed therefrom and yet is held firmly in place. A stop collar 175 is provided on the stem 174 which limits the inward movement of the stem.

By reason of the flexibility of the reeds 140, the sensitive gaging point finger 136 can pivot slightly in a horizontal plane, thereby causing the attached actuator arm 156 to swing and operate the dial indicator gage. The indicator hand rotates clockwise as the operating pin is depressed and the indicia on the dial face progresses numerically in a counterclockwise direction so that, as the actuator arm moves toward the left in Fig. 4, the indicator hand swings toward zero. The actuator arm 156 and, consequently, the gaging point finger 136 are urged in a counterclockwise direction, with reference to Fig. 4, by a spring 178 and are limited in counterclockwise movement by the stop collar 175. Spring 178 is connected at its upper end to the upper end of actuator arm 156 by a pin 180 and at its lower end to the end of a horizontal adjustment screw 182 mounted in the guide block 56. It will be seen that as screw 182 is moved outward or toward the left, with reference to Fig. 8, a greater counterclockwise bias is applied to the gaging point finger 136. The finger 136 has a cut out portion at 184 to provide clearance for the screw 182.

Mounted on finger 136 by means of a cap screw 185 is a stock block 187. The square clearance opening in the block for the attaching screw is sufficiently larger than the screw to permit limited longitudinal adjustment of the block on the finger and the block is attached in such manner that one end thereof, see Figs. 5 and 6, is spaced from the adjacent side of the guide block 56 by a few thousandths of an inch. This permits the finger 136 to rotate freely, but stops any rearward longitudinal movement which may be occasioned by a jarring bump at the exteriorly projecting end of the finger and which might otherwise cause the finger to be misaligned. Also mounted on the face of front casing 10 is a stop block 189 which is attached to the plate by a countersunk screw 191 and which may be rotated by loosening the screw so as to limit the upward free movement of the projecting finger portion 138 thereby to prevent misalignment or springing of the reeds by an upward jarring blow on the projecting finger portion, see Fig. 3.

It will be understood that the device shown herein is particularly adapted to measuring the inside diameters of rings or cylinders or the like and that, in order to insure the accurate measurement of the work, it is essential that it be centralized by holding the work in position so that gaging points carried in the sensitive and adjustable fingers contact the inner surface of the bore precisely at its diameter and not merely along a chord. Since this position cannot be maintained manually with any degree of accuracy, I have provided a third centralizer member 188 which will be referred to as the centralizer arm. Centralizer arm 188 has an exteriorly projecting portion which lies coextensive with and is above and between the exteriorly projecting finger portions 124 and 138. Arm 188 is, like finger portion 138, substantially a quadrant in cross-section and together with the half-circular finger portion 124 and finger portion 138 forms an exteriorly projecting cylindrical shape when the fingers are in their contracted position. The arm 188 and finger portions 124 and 138 are chamfered at their outer ends at an angle of 15°, as indicated. The arm 188 has a short square section 190 at its inner end which abuts the face of a vertically arranged slidable centralizer plate 192 and is rigidly attached to the plate by a cap screw 194.

The centralizer plate 192 is arranged to slide vertically and horizontally and is retained in a vertical position between pads 26 and 28, projecting inwardly from the inside surface of front casing 10, and straps 200 which are attached to the inside surface of the front casing by cap screws 202. The straps 200 are also provided with extruded contact pads 204 and 206 in order to reduce the area of contact with the plate. The lower edge of plate 192 is provided with three flat surfaces 208, 210, and 212, which extend upwardly at a 45° angle to the horizonal sliding plate 46, the central surface 210 extending upwardly and toward the left from the horizontal plate surface and the two end surfaces 210 and 212 extending upwardly and toward the right, with reference to Figs. 3 and 4. The center angle surface 210 bears downward against the side 128 of finger 122 and the angle surfaces 208 and 212 bear downward against 45° angle surfaces 214 on a pair of spaced guide bosses 216 which are cast integral with the casing 10. A spring 218, having a coiled portion 220 lying on the right of the center of plate 192 and having straight portions 222 and 224 extending toward the left and being connected at the end of one of its straight portions to plate 192 at 225 and having the end of its other straight portion anchored to casing 10, biases plate 192 in a downward and leftward direction, see Fig. 3.

Referring to Figs. 3 and 4, it will be seen from the foregoing that as sliding plate 46, which carries the finger 122, is moved toward the right, the plate 192, by reason of the engagement of its surface 210 with surface 128 of finger 122 and by reason of the engagement of its surfaces 208 and 212 with surfaces 214 near its ends, which are perpendicular to surface 128, is caused to move in a path upward and to the right at an angle of 45° to the horizontal. The vertical and horizontal components of this plate movement are each equal to one-half the horizontal movement of finger 122, and the centralizer arm 188 being attached to the plate 192 will, therefore, always be moved vertically and horizontally by distances equal to one-half of the horizontal movement of the movable gage finger 122.

Any particular points on these fingers which are arranged in a circle so that two of the points are on the diameter with the third point midway between will always maintain this relationship as the movable finger 122 is moved to the right or left. In Fig. 3, the fingers are shown in full line in a contracted position for gaging a relatively small bore which is indicated by a dot-dash line 226. The corresponding position of plate 192 for this position of the fingers is shown in solid and dotted lines. The centralizer arm and movable gaging finger are also shown in dotted lines in an expanded position for gaging a larger bore which is indicated by dot-dash line 228, and the corresponding position of plate 192 for this expanded position of the fingers is indicated in dot-dash lines.

The centralizer arm 188 and finger portions 124 and 138 have transverse through bores 230 and 232 respectively near their outer ends into which are fitted gaging points 234 and a centralizer point 236. The gaging points 234, shown in detail in Figs. 15 and 16, are of general cylindrical form with one frusto-conical end 238, and they are provided with tungsten carbide inserts 240. These inserts are of cylindrical form with flat ends and are fitted into a longitudinal bore in member 234 with their flat ends projecting slightly and are held rigidly therein by crimping the conical end 238 of the member in a plane perpendicular to the flat surfaces of the inserts, as indicated. The points 234 are further provided with a transverse conical recess 242 which receives a conical point set screw 244 mounted longitudinally in the end of the finger. The centralizer point 236 is of generally cylindrical form with a spherically ground tip 246 and a longitudinally extending flat surface 248 which is abutted by a flat end set screw 250 mounted longitudinally in the end of arm 188. The gaging points 234 are thus locked in position in the fingers against rotation or longitudinal movement by set screws 244 with the flat surfaces of their hard inserts in a horizontal position, and the centralizer point is locked in position by set screw 250. The provision of the longitudinal flat surface 248 on the centralizer point 236, together with the flat end set screw, however, permits the longitudinal adjustment of the centralizer point in its bore.

The centralizer arm 188 and finger portions 124 and 138 are further provided with transverse threaded holes 252 adapted to receive in threaded engagement additional gaging points 254 and centralizer point 256. Several sets of additional points such as 254 and 256 of varying lengths are provided in order to extend the range of use of the device beyond the diameters which can be reached by adjustment of the gage when using points 234 and 236. Gage points 254 are provided with a threaded portion 258 and a head portion 260. The head portion 260 is provided with a reduced diameter portion 261 and has a conical outer end with a spherically ground tip 262. The inner end of the head portion forms a square shoulder which abuts a flat-bottomed countersink in the finger member. The centralizer point 256 is of two piece construction with a longitudinally adjustable head 264 having a bore 266 into which fits the head 268 of a screw 270. The intermediate portion of screw head 268 is reduced in diameter at 272 and a transverse set screw 274, mounted in the head member 264, bears against this reduced portion and locks the head in position. The length of the reduced diameter portion is such as to permit limited longitudinal adjustment of the head 264 on the screw head. The upper end of head member 264 is conical with a spherically ground tip 276. It will be seen from Figs. 11 to 14 that the design and arrangement of the points is such that the larger sets of points 254 and 256 may be installed for temporary operation in the gaging of large diameter bores without removing or disturbing the setting of the smaller set of points 234 and 236.

When gaging the bore in a piece of work, the work is placed in position on the gaging points with the bore parallel to the fingers but with the work piece spaced from the gage cover plate. With the weight of the work piece resting on the centralizer point, it is then rocked slightly in a horizontal plane to obtain the minimum indicator reading. The purpose of maintaining some downward pressure on the centralizer arm when setting the device or when gaging work is to insure that the vertical plate 192, which has a free sliding fit relationship in its guides, is always pressed in the same direction against its guides. Normally the weight of the centralizer arm and the point of application of force of the spring 218 retain the plate pressed lightly against its guides in this direction. It will be noted that the relative size of plate 192 and the spacing and arrangement of its guide surfaces are such that considerable weight may be placed on the centrally attached centralizer arm without distortion.

The foregoing description is intended to be illustrative and not limiting, the scope of the invention being set forth in the appended claims.

I claim:

1. In an internal diameter gage, a set of three gage point holders comprising, a sensitive gaging finger yieldably mounted and operatively connected to an indicator, an adjustable gaging finger arranged for rectilinear adjustment with respect to said sensitive finger, and a slidably mounted centralizing finger mounted between said sensitive finger and said adjustable finger, each of said fingers having a contact point, which points are arranged on a circle with the contact points of the sensitive finger and adjustable finger lying precisely on a diameter of the circle, and screw operated means including a cam surface for jointly adjusting said adjustable finger and said centralizing finger so as to maintain said three contact points on the circumference of a circle.

2. In an internal diameter gage, a set of three fingers comprising, a sensitive gaging finger yieldably mounted and operatively connected to an indicator, an adjustable gage finger arranged for horizontal adjustment with respect to said sensitive gaging finger, and a downwardly biased centralizing finger mounted between and above said sensitive finger and said adjustable finger and arranged for vertical and horizontal sliding movement, each of said fingers having a contact point arranged on the circumference of a circle of which the line joining the contact points of the sensitive finger and adjustable finger forms a diameter, screw operated means for horizontally positioning said adjustable finger, and cooperating surfaces on said adjustable finger and said centralizing finger causing said centralizing finger to be jointly adjusted, with said adjustable finger by said screw operated means so as to maintain the contact points of all three fingers on the circumference of a circle.

3. A gaging device comprising a main body structure, a yieldably mounted contact member carried by said main body structure, an adjustable contact member mounted and arranged for rectilinear movement with respect thereto, a pair of angularly disposed guide surfaces, one of said guide surfaces being on said body member and the other being on said adjustable contact member, a centralizing member slidably mounted on said body structure between said angular guide surfaces, and spring means for holding said centralizer member in contact with said guide surfaces.

4. In a gaging device, a main body structure, a sensitive contact carrying member yieldably supported thereon, horizontal guide means carried by said body, a horizontally adjustable contact carrying member guided thereby, an angular guide surface carried by said adjustable member, which surface extends upward at an angle of 45° to the horizontal, a pair of fixed angular guide surfaces carried by said body and spaced horizontally on opposite sides of said adjustable member, said fixed guide surfaces being at 90° to said movable guide surface, and a centralizer member having cooperating surfaces parallel with said fixed and movable guide surfaces and being yieldably urged downward in contact with said guide surfaces.

5. A device as set forth in claim 4 in which the centralizer member comprises a vertically arranged slidable plate guided in said body structure and having a work engaging finger carried thereon which extends horizontally from one side thereof, and in which spring means urging the plate downward is applied to the side of said plate from which said finger projects.

6. A device as set forth in claim 4 in which means for urging the centralizer member downward comprises, a spring having a coil portion disposed at one side of said centralizer member and having a pair of extensive leg portions diverging from said coil portion with one of said leg portions being fixed to said body structure and the other to said centralizer member, whereby said centralizer member is urged downward by a force having a slight component acting normal to said movable angular surface and parallel with said fixed angular surfaces.

7. In a gage of the class described, a casing having a vertical wall, a horizontal support plate in said casing attached at one edge to said wall, a horizontal sensitive gaging finger yieldably supported on said plate and extending exteriorly of said casing through an opening therein, a sliding plate slidable on said support plate and guided for movement parallel with said wall, a second gaging finger rigidly attached to said sliding plate and projecting exteriorly in parallel relationship with said sensitive finger, a centralizer plate in said casing overlying said gaging fingers and arranged parallel with and adjacent said wall and being slidably guided for vertical and horizontal movement parallel with said wall, a horizontal centralizer arm mounted on said plate and extending exteriorly of said casing in parallel relationship with said gaging fingers, an upper inclined surface on said second gaging finger extending upwardly at an angle of 45° to said sliding plate, a lower surface on said centralizer plate parallel with and in engagement with said inclined surface, means biasing said plate downward against said inclined surface, guide surfaces on said wall, one on each side of said gaging fingers, which surfaces extend upwardly at an angle of 45° to the horizontal and which are perpendicular to the inclined surface on said second gaging finger, and additional lower surfaces on said plate, one at each end thereof, parallel with and in engagement with said guide surfaces.

8. In a gage of the class described, a support plate, a sensitive gaging finger resiliently mounted on said plate, a sliding plate member slidable on said support plate, a second gaging finger attached to said sliding plate and extending in parallel relationship with said sensitive finger, a bowed leaf spring arranged perpendicular to said sliding plate and reacting at one end against said sliding plate and at its other end against a fixed support, and screw operated means for applying a force to the intermediate portion of said spring in a direction so as to tend to straighten said spring, thereby to frictionally lock said sliding plate in position on said support plate.

9. A device as set forth in claim 8 in which said sliding plate is provided with end slots into which are entered spaced perpendicular guide members carried by said support plate for guiding said sliding plate, and in which one of said guide members includes means providing a fixed abutment for one end of said bowed spring and additionally provides support means for said screw operated means.

10. A device as set forth in claim 8 in which said sliding plate is provided with end slots into which are entered spaced perpendicular guide members carried by said support plate for guiding said sliding plate, and in which spring pressed guide shoes slidably mounted in said guide member and having angle surfaces cooperating with similar angle surfaces on said sliding plate urge said plate in one direction so as to press it against one side of said guide members and in a perpendicular direction against said support plate.

11. In a gage, a support plate, a pair of elongated reed support members arranged in spaced parallel relationship on said support plate, an elongated flexible reed overlying each of said reed support members and extending at one end beyond one end of said support members, said support members and reeds being fixed at their other ends to said support plate, a sensitive gaging finger extending transversely of said reeds and being connected to said reeds at their free projecting ends, an indicator having an operative connection with said sensitive finger, a sliding plate member slidable on said support plate parallel with the surface thereof and transversely of said sensitive finger, a second gaging finger lying parallel with said sensitive gaging finger and attached to said sliding plate member.

12. A device as set forth in claim 11 in which means is provided for independently adjusting the free ends of said reed support members relative to the surface of said support plate, thereby to position the sensitive finger in accurate parallel relationship with said support plate and in accurate alignment with said second gaging finger.

13. A device as set forth in claim 11 in which the free ends of said reed support members are formed laterally slightly in a direction away from said support plate and have rounded edges underlying the free ends of said reeds thereby to form pivot points, and in which said sensitive finger is biased in a rotational direction so as to cause said reeds to bear against said pivot points.

14. In a gage, a casing, a horizontal support member mounted in said casing, a flexible metal strip attached at one end to said support and having an underlying pivot support near its free end, a transverse sensitive gaging finger attached to the free end of said strip and spaced vertically therefrom, whereby said finger may be rotated about a horizontal axis at said pivot as said strip flexes, a gage point mounted in said finger and extending horizontally therefrom, an actuator arm attached to said sensitive finger and extending vertically therefrom and having a contact surface at its upper free end, means for biasing said sensitive finger in one rotational direction so as to cause the free end of said strip to be pressed downward against said pivot, an indicator mounted on said casing having a horizontal operating stem adapted to be engaged by said actuator arm contact surface, stop means on said indicator stem for limiting the rotational bias of said sensitive finger, and said pivot, said gage point and said contact surface at the end of said actuator arm being in substantially vertical alignment when in this limited rotational position.

15. A device as set forth in claim 14 in which said biasing means comprises a tension spring connected at one end to said actuator arm near its upper free end and connected at its other end at a point closely adjacent said pivot to a horizontally adjustable member carried by said support, whereby an adjustable soft spring action is attained and wherein the change in bias upon rotation of said sensitive finger is negligible due to the relative positions of the connected ends of said spring with respect to said pivot.

16. In an internal diameter gage, a group of three parallel fingers, one of said fingers being semi-circular in cross-section and the other two fingers being substantially quarter-circular in cross-section, said fingers being arranged to collectively form a cylindrical shape when their flat surfaces are closely adjacent each other, said semi-circular finger being slidably mounted for adjustment along a line lying at 45° to its flat side, one of said quarter-circular fingers being guided for movement along a line parallel with the flat surface of said semi-circular member, and said other quarter-circular finger being resiliently mounted for slight displacement in a direction parallel with the line of movement of said semi-circular finger.

17. A group of gaging fingers as set forth in claim 16 in which said resiliently mounted finger and said semi-circular finger are provided with gaging points fitted into transverse bores in said fingers near their ends, which gage points are locked in position by set screws in the ends of said fingers, and in which said other quarter-circular finger is provided with a centralizing point slidably adjustable in a transverse bore near its end, which centralizing point is held in adjusted position by a set screw in the end of said finger.

18. A group of gaging fingers as set forth in claim 16 which are provided with a pair of gaging points and a centralizing point mounted in transverse bores near their ends, and a pair of extension gaging points and an extension centralizer point threadedly engaged in threaded transverse bores therein, spaced from the ends of said fingers sufficiently to permit insertion and removal of said extension points without disturbing the setting of said other points.

19. A gaging finger having a transverse bore near its end, a gage point of general cylindrical shape fitted in said bore, a hard insert mounted in the end of said gage point, said insert having a flat tip of rectangular cross-section with its long sides lying longitudinally of said finger, said gage point having a transverse conical recess in the side thereof having its axis in parallel alignment with the long sides of said insert, and a conical point set screw mounted longitudinally in the end of said finger for engaging the conical recess in said gage point.

20. An adjustable gage point comprising a stud member having a threaded portion at one end for threaded engagement in a gage point holder, and an enlarged cylindrical portion at the other end having an intermediate portion thereof of reduced diameter, an adjustable head having a bore in one end adapted to slidably fit said enlarged cylindrical stud portion, the other end of said head being tapered to a spherically ground tip, and a flat end set screw mounted transversely in said head and adapted to engage the reduced diameter portion of said stud member.

21. In a gage of the class described, a support member, a horizontal flexible metal strip attached at one end to said support, means forming a pivot point underlying said strip near its free end, a gaging finger arranged transversely of said strip and attached to the free end of said strip slightly beyond said pivot point, said finger having a portion thereof offset horizontally toward the fixed end of said strip, a horizontal gaging point mounted in said offset portion and extending outward toward the free end of said strip, said gaging point being spaced vertically from said strip and having its contacting end in substantially vertical alignment with said pivot point, means for biasing said finger in a direction so as to cause the free end of said strip to bear downward against said pivot point and to cause it to be flexed slightly, stop means for limiting said flexing, an indicator, and motion multiplying means operatively connected to said finger and said indicator.

22. In a device of the class described, a support structure, a first gage contact carrying member yieldably mounted on said support, a second gage contact carrying member slidably mounted for horizontal adjustment toward and away from said first member, screw operated means for slidably adjusting said second contact carrying member, a pair of fixed inclined surfaces on said support structure horizontally spaced on opposite sides of said contact carrying members, a downwardly biased, horizontally elongated work centralizer member slidably mounted for free movement in a vertical plane and overlying said gage contact carrying members and said spaced inclined surfaces, and said centralizer member having a pair of spaced underlying surfaces, one near each end thereof, which surfaces are parallel with and in contact with said fixed inclined surfaces, said horizontally adjustable contact carrying member having an upper inclined surface which is perpendicular to said fixed inclined surfaces, and said centralizer member having a third intermediate underlying surface which is parallel with and in contact with said inclined surface on said horizontally adjustable contact carrying member whereby said centralizer member is jointly adjusted with said horizontally adjustable member by said screw operated means.

References Cited in the file of this patent

UNITED STATES PATENTS

| | | |
|---|---|---|
| 1,593,753 | Darlington | July 27, 1926 |
| 2,249,904 | Lewis | July 22, 1941 |
| 2,331,779 | Hjarpe et al. | Oct. 12, 1943 |
| 2,350,394 | Ellstrom | June 6, 1944 |
| 2,411,292 | Rappl | Nov. 19, 1946 |
| 2,581,955 | Hunter | Jan. 8, 1952 |
| 2,589,865 | Rivard | Mar. 18, 1952 |
| 2,607,123 | Sheridan | Aug. 19, 1952 |

FOREIGN PATENTS

| | | |
|---|---|---|
| 571,533 | Great Britain | Aug. 29, 1945 |